United States Patent
Cinos et al.

(10) Patent No.: US 10,915,343 B2
(45) Date of Patent: Feb. 9, 2021

(54) SERVER COMPUTER EXECUTION OF CLIENT EXECUTABLE CODE

(71) Applicant: Atlassian Pty Ltd, Sydney (AU)

(72) Inventors: Sergio Cinos, Sydney (AU); Zekkai Zheng, Sydney (AU); Matt Quail, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 16/049,582

(22) Filed: Jul. 30, 2018

(65) Prior Publication Data

US 2020/0004567 A1 Jan. 2, 2020

Related U.S. Application Data

(60) Provisional application No. 62/691,957, filed on Jun. 29, 2018.

(51) Int. Cl.
*G06F 9/44* (2018.01)
*G06F 9/455* (2018.01)
(Continued)

(52) U.S. Cl.
CPC ...... *G06F 9/45508* (2013.01); *G06F 9/45516* (2013.01); *G06F 9/45558* (2013.01);
(Continued)

(58) Field of Classification Search
CPC ............. G06F 9/45516; G06F 9/45508; G06F 9/45558; G06F 9/485; G06F 2009/45562; H04L 67/32; H04L 67/34; H04L 67/42
(Continued)

(56) References Cited

U.S. PATENT DOCUMENTS

| | | | |
|---|---|---|---|
| 6,990,653 B1 * | 1/2006 | Burd | G06F 16/972 717/108 |
| 7,120,897 B2 * | 10/2006 | Ebbo | G06F 16/972 717/108 |

(Continued)

OTHER PUBLICATIONS

Thomas Feilhauer et al., "DEF—a programming language agnostic framework and execution environment for the parallel execution of library routines", 2016, Journal of Cloud Computing:Advances, Systems and Applications, 17 pages (Year: 2016).*

(Continued)

*Primary Examiner* — Ted T. Vo
(74) *Attorney, Agent, or Firm* — Brownstein Hyatt Farber Schreck, LLP (57) ABSTRACT

Techniques for improving server-side execution of script code include in one embodiment: receiving, at a server computer, a request from a client computer to provide a service of an application that the server computer hosts; acquiring a particular runtime from among a plurality of pre-computed runtimes in a runtime pool, each of the pre-computed runtimes in the runtime pool comprising an executable combination of computer program script code and context data that is programmed to create and use one or more data items having global scope; using the server computer, providing the request to the particular runtime and executing the particular runtime to cause generating a response to the request; transmitting the response to the client computer; cleaning up the one or more data items having global scope and returning the particular runtime to the runtime pool after completing the cleaning up.

19 Claims, 5 Drawing Sheets

(51) Int. Cl.
*G06F 9/48* (2006.01)
*H04L 29/08* (2006.01)
*H04L 29/06* (2006.01)

(52) U.S. Cl.
CPC .............. *G06F 9/485* (2013.01); *H04L 67/32* (2013.01); *H04L 67/34* (2013.01); *H04L 67/42* (2013.01); *G06F 2009/45562* (2013.01)

(58) Field of Classification Search
USPC .......................... 717/106–107, 114–119, 148
See application file for complete search history.

(56) References Cited

U.S. PATENT DOCUMENTS

| | | | | |
|---|---|---|---|---|
| 10,268,460 | B2* | 4/2019 | Grigoryan | G06F 8/36 |
| 2015/0074181 | A1* | 3/2015 | Taerum | H04L 67/10 |
| | | | | 709/203 |
| 2018/0210714 | A1* | 7/2018 | Grigoryan | G06F 17/2264 |

OTHER PUBLICATIONS

W3schools, "Node.js Introduction", May 2015, retrieved from w3schools.com, Web Developer Site, 2 pages (Year: 2015).*

Andrew Liu, "Running JavaScript in Azure DocumentDB with Chakra", 2016, Microsoft Azure blog: https://azure.microsoft.com/en-in/blog/the-road-ahead-for-azure-documentdb-with-chakracore/, 7 pages (Year: 2016).*

Eric Bidelman, "Headless Chrome: an answer to server-side rendering JS sites", Apr. 2018, retrieved from https://web.archive.org/web/20180402222821/https://developers.google.com/web/tools/puppeteer/articles/ssr/, 21 pages (Year: 2018).*

Narayan Prusty, "JavaScript Global Variables and Memory Leakage", 2015, MIT License, 5 pages (Year: 2015).*

* cited by examiner

SERVER COMPUTER EXECUTION OF CLIENT EXECUTABLE CODE

BENEFIT CLAIM

This application claims the benefit of provisional application 62/691,957, filed Jun. 29, 2018, the entire contents of which are hereby incorporated by reference for all purposes as if fully set forth herein.

FIELD OF THE DISCLOSURE

One technical field of the present disclosure is computer-implemented methods for executing computer program script code that is normally executed by browsers or other client computer elements of a client-server system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Certain types of computer program source code, such as script code, have been developed and optimized in part for execution in client computing elements such as browsers. An example is JAVASCRIPT. In one use case, a server computer loads a JAVASCRIPT file, or dynamically generates JAVASCRIPT code, and transmits the code to a client computer over a network. At the client computer, the JAVASCRIPT code is automatically parsed and interpreted, causing the client computer or the browser to perform useful work.

In other cases, efficient execution of server computer application programs can be improved by parsing and interpreting such script code at the server, rather than at the client. The term "server-side rendering" is sometimes used to refer to execution of the script code by the server computer, which results in rendering HTML code in some cases, for transmission to a browser.

However, past implementations of server-side rendering have had drawbacks. One problem with past implementations of server-side rendering is that to achieve high performance, runtimes are re-used between client requests, and therefore the inability to guarantee that confidential information is removed from memory between successive executions of the same script code. For some applications, preserving the confidentiality of information during the rendering process is critical. In conventional use of JAVASCRIPT with a browser, this issue does not arise; while code execution at the browser may cause creating a context area in memory to which confidential data might be written, when the browser refreshes the web page that transmits the script code, the browser automatically deletes and recreates the context, with assured loss of all confidential data that was in it. In contrast, in server-side rendering, typically one logical computing node is executing the same script code repeatedly for each different user of an application, and a single virtual browser window in memory is typically used. Furthermore, for every request on the server side is not practical for performance reasons. Therefore, whatever data is stored in the context area upon completion of processing for one user request may be present when the next request is processed.

While some aspects of the server-side program could be written with rules to mandate erasure of the relevant memory area with every user request, this comes at the cost of significant overhead. The required "clean-up" of memory, including deletion and recreation of a server-side headless browser runtime, may take more time than actually rendering a page on the client. Furthermore, if an implementation was programmed to rely upon cleaning up an existing runtime, there would be no way to assure that appropriate deletion or refreshing would be performed by any open-source or third-party libraries that are integrated into a server-side executable. In this situation, it would be theoretically possible for data of one user request to be exposed to another, which is not acceptable.

SUMMARY

Techniques are provided for server-side rendering of computer program script code with improved security. Furthermore, the appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In one embodiment, a server computer is programmed to create and store, for each application that the server computer serves, a runtime pool comprising a plurality of precomputed runtime instances that are capable of executing specified script code that can process client requests. Each runtime instance comprises a compiled, executable set of program instructions that are based upon the same script source code and context data; in a single embodiment, the context data specifies global data storage variables or other items, such as window objects, document objects or other data items with global scope that the script code interacts with to process client requests.

After the runtime pool is established, client requests arrive asynchronously and are assigned to worker processes or threads. Each worker process acquires a particular single runtime instance from the pool, then executes the runtime to process a particular client request, resulting in changes to the state of the global data items. The worker process returns or dispatches a response to the client request. In some embodiments, each worker process is instantiated using a separate compute node.

In a first embodiment, the worker process then executes one or more cleanup operations on the runtime instance, to delete or reset values in the global data items, and returns the runtime instance to the runtime pool. Monitoring processes, as further described in other sections, may be used to generate and inspect a whitelist of data items that are permitted to change from execution to execution in a particular runtime without impacting potential leakage of confidential data.

In another embodiment, the worker process deletes the runtime instance. Separately, a factory process continuously creates new runtime instances and adds them to the runtime pool to replace a deleted instance and/or replenish the pool.

With this approach, script code can be efficiently processed in a server computer without retaining in memory the values of global scope data items that could be inadvertently provided to a client, process or computer that is not authorized to access those values.

In one embodiment, a data processing method comprises receiving, at a server computer, a request from a client computer to provide a service of an application that the server computer hosts; acquiring a particular runtime from among a plurality of pre-computed runtimes in a runtime pool, each of the pre-computed runtimes in the runtime pool comprising an executable combination of computer program script code and context data that is programmed to create and use one or more data items having global scope; using the server computer, providing the request to the particular runtime and executing the particular runtime to cause generating a response to the request; transmitting the response to the client computer; cleaning up the one or more data items having global scope and returning the particular runtime to the runtime pool after completing the cleaning up.

In another embodiment, a data processing method comprises receiving, at a server computer, a request from a client computer to provide a service of an application that the server computer hosts; acquiring a particular runtime from among a plurality of pre-computed runtimes in a runtime pool, each of the pre-computed runtimes in the runtime pool comprising an executable combination of computer program script code and context data that is programmed to create and use one or more data items having global scope; using the server computer, providing the request to the particular runtime and executing the particular runtime to cause generating a response to the request; transmitting the response to the client computer; deleting the particular runtime; asynchronously creating one or more new pre-computed runtimes and adding the new pre-computed runtimes to the runtime pool.

Example Distributed Server Computer System with Server-Side Rendering

Figure 1:
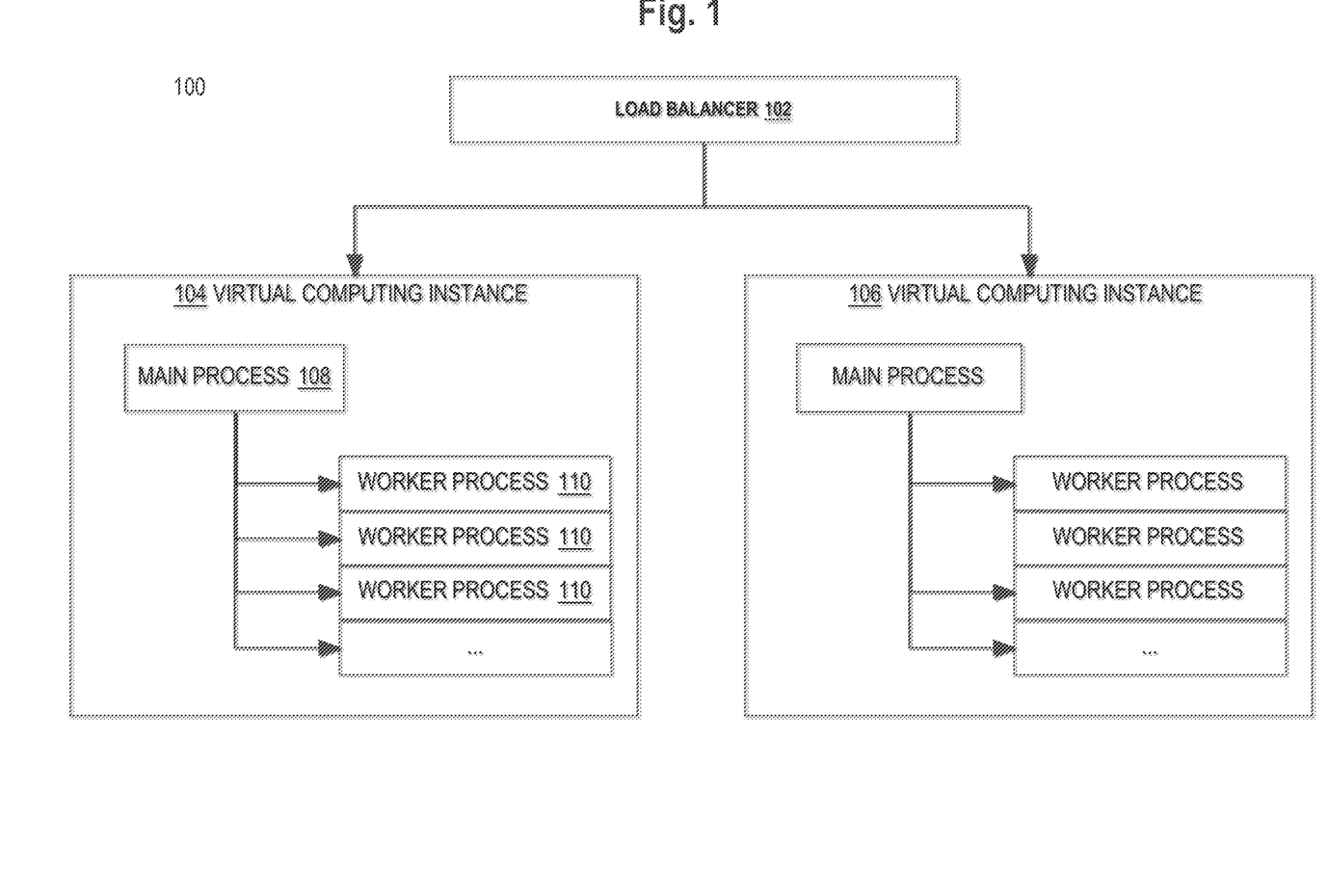
FIG. 1 illustrates a distributed computer system that may be used to implement one embodiment, in block diagram form.

FIG. 1 illustrates a distributed computer system that may be used to implement one embodiment, in block diagram form.

In an embodiment, a distributed computer system 100 comprises a load balancer 102 and two or more computing instances 104, 106. Each of the computing instances 104, 106 may comprise any of a CPU, multi-core processor, server computer, programmatic container, virtual computing instance or public cloud computing instances. The specific hardware, virtualization arrangement or operating system software of computing instances 104, 106 is not critical. The load balancer 102 is programmed to receive client requests from external client computers or browsers over networks or internetworks, and to distribute requests to a selected one of the computing instances 104, 106.

Each of the computing instances 104, 106 hosts or executes a main process 108 and a plurality of worker processes 110; there may be any number of worker processes. Each main process 108 is programmed to receive client requests arriving from external computers or browsers via the load balancer 102 and distribute the requests to one of the worker processes 110 based on load or other factors. In some embodiments, a round-robin process may be used to distribute work to worker processes 110, or active monitoring may be used to detect which worker process(es) is/are free and to distribute a request to one of the free processes. Alternatively, each worker process may be instantiated using a separate compute node and assigned client requests with or without load monitoring.

Figure 2:
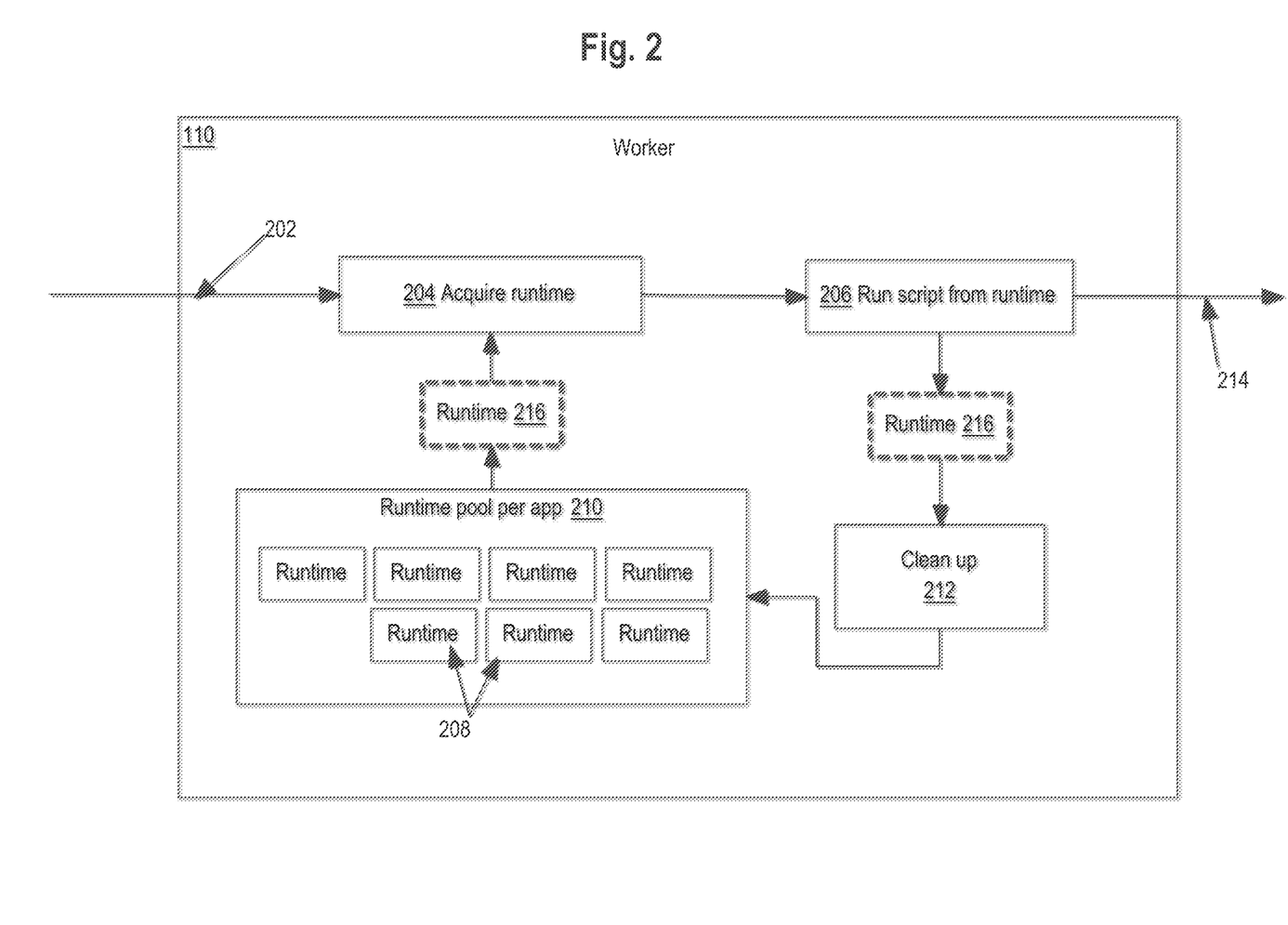
FIG. 2 illustrates functional and structural elements of an example worker process, in one embodiment.

FIG. 2 illustrates functional and structural elements of an example worker process, in one embodiment. In one embodiment, each arrow in FIG. 2 may comprise scheduling a task in a different queue; that is, an arrow in the diagram does not necessarily require a direct programmatic communication path or an immediate responsive action but instead may include buffering or queuing to manage throughput.

In an embodiment, each worker thread 110 has access to a runtime pool 210 that comprises a plurality of identical runtime instances 208; a different runtime pool is maintained for each application to which client computers may direct requests. The example of FIG. 2 shows a runtime pool 210 comprising seven (7) runtime instances 208 but other embodiments may use more or fewer runtime instances, for example, depending on the average time needed to service a typical client request. Five (5) to ten (10) runtime instances 208 in the pool 210 might be typical. Each runtime instance 208 comprises a pre-computed executable that combines a script and context data in the manner previously described. The use of runtime pool 210 avoids processing delays that would otherwise occur if an embodiment attempted to instantiate one runtime per client request. Runtimes have been found to require 200 ms to 500 ms to instantiate in practice, which would introduce an unacceptable period of delay in a server response, which would be noticeable to users of applications.

In some embodiments, each runtime instance 208 executes in a sandbox implemented as a Node.js virtual machine. Creating a particular runtime instance 208, as part of initializing runtime pool 210 or as part of a runtime factory, which is described further in other sections herein, may comprise joining script code and context data, creating a new window object, compiling and reinitializing all modules of the runtime. In an embodiment, the context data comprises a set of variables, data items or memory locations having global scope that the script will access during execution. The window object is an example variable having global scope; in some embodiments, other global variables such as document objects may be created, depending on requirements of an application.

In operation, in the example of FIG. 2, a request 202 arrives at a worker thread 110. In response, the worker thread 110 is programmed to select and use, or acquire, a runtime instance 216 from the runtime pool 210, as indicated by block 204. Acquiring a runtime instance 216 may comprise programmatically requesting an available runtime from the runtime pool 210 and receiving back a reference to an available runtime instance 216. The runtime pool 210 may maintain an internal list in memory of all available runtime instances 208 and may mark the particular runtime instance 216 as locked or unavailable after allocating it to the worker thread 110. In one embodiment, a single runtime pool 210 services all worker threads 110 shown in FIG. 1 in this manner.

While FIG. 2 illustrates a particular runtime instance 216 conceptually moving among functional elements of FIG. 2, in an actual implementation, each runtime instance 208, 216 occupies a separate fixed address space of main memory, such as a set of pages of main memory, and executes within that address space. Any variables or other data items having global scope will be created within the same address space and located there for as long as the runtime pool 210 has been allocated and exists.

At block 206, the worker thread 110 of FIG. 2 executes the script code contained in the runtime in connection with the client request 202 that was received. This execution may result in writing confidential data values to one or more variables, data items or other memory locations having global scope, in main memory. Upon completing execution of the script code, the worker thread 110 dispatches a response 214 to the client.

At block 212, the worker thread 110 performs cleanup operations and returns the runtime instance 216 to the runtime pool 210. Cleanup, in this context, may comprise deleting the variables, data items or other memory locations having global scope. Therefore, on a subsequent execution of the same runtime instance 216 for another client request, the variables, data items or other memory locations having global scope will not retain any data that was created to process a prior specific client request.

It will be seen that when successive client requests are associated with different tenants of a multi-tenant application, or otherwise involve different sets of confidential information of different parties, this approach has the benefit of increasing confidence that successive executions of the same runtime instance 208, 216 from the runtime pool 210 will not permit leakage of confidential data between the different tenants by cleaning up as much data in runtimes as practical. Monitoring code that is programmed to watch for potential data leakage may be used, as the foregoing approaches are generally not capable of cleaning up data that is held in JAVASCRIPT closures. In JAVASCRIPT, a closure is the combination of a function and the lexical environment within which that function was declared.

The approach of FIG. 2 may optionally incorporate logic in worker threads 110 that is programmed to execute a validation process. In one example validation process, the worker threads 110 are programmed to cause every Nth request to be processed twice: once in the manner just described for FIG. 2, and also in a separate runtime instance that is instantiated on demand and not acquired from the runtime pool 210. Result data for both executions is compared. If the output is different, then the runtime instance 208 that was acquired from the runtime pool 210 was leaking data from the previous request that was processed with it. In one embodiment, N is "10", but other values may be used to cause more frequent or less frequent validation.

Validation with this process may yield false positive results that arise from changes, among the two executions, in timestamps, random numbers that are generated, or other values that are different but not risky with respect to data leakage. In some embodiments, worker threads 110 that implement validation may be programmed to inspect a whitelist of permitted variations in output, global scope data items or variables, or other aspects of the results of comparative execution using the validation process. Using automatic monitoring code, or manual intervention, the whitelist may be updated periodically as added false positive results are identified. In some embodiments, a separate whitelist of this type is maintained for each different application for which server-side rendering is used.

Figure 3:
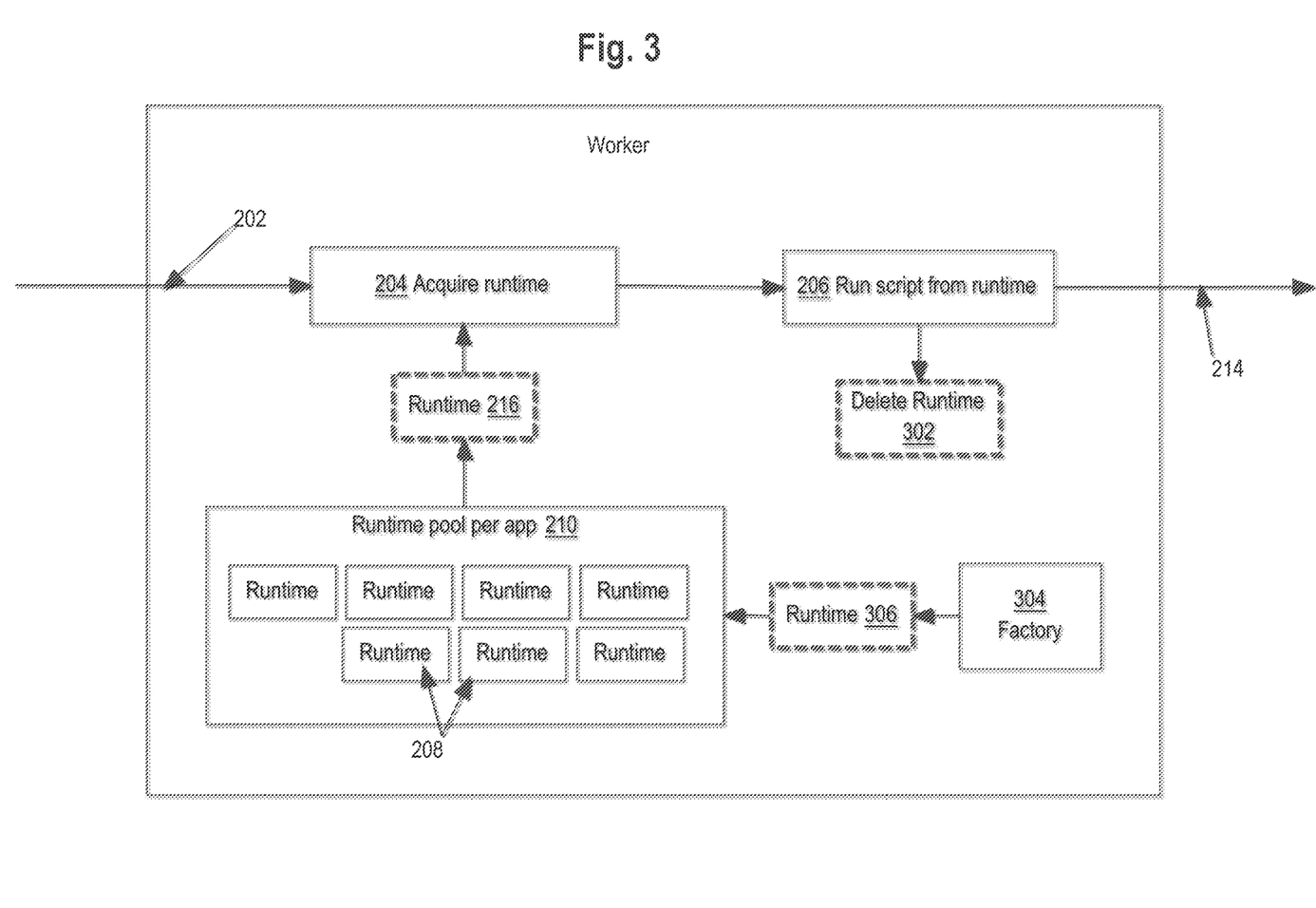
FIG. 3 illustrates functional and structural elements of an example worker process, in another embodiment.

FIG. 3 illustrates functional and structural elements of an example worker process, in another embodiment. In FIG. 3, elements with the same reference numerals as in FIG. 2 have the same structure and/or function as previously described for FIG. 2. As with FIG. 2, each arrow in FIG. 3 may comprise scheduling a task in a different queue; that is, an arrow in the diagram does not necessarily require a direct programmatic communication path or an immediate responsive action but instead may include buffering or queuing to manage throughput.

In the embodiment of FIG. 3, after completion of executing a particular runtime 216 at block 206, that runtime is deleted, as shown by block 302. Deletion may comprise deallocating memory associated with the runtime or using a memory delete operation to write default or random values to all addresses in the address space previously used by the particular runtime 216.

Asynchronously a runtime factory 304 instantiates a new runtime instance 306 and adds the new runtime instance 306 to the runtime pool 210. Instantiation may comprise the same steps of compiling script source code, based on context data, as previously described for creating other new runtimes as part of initialization of the runtime pool 210. In some embodiments, factory 304 includes monitor code that periodically polls the runtime pool 210 to obtain a count of the number of available runtime instances 208 in the pool, and instantiates the new runtime instance 306 in response to detecting that the count is below a threshold specified in configuration data or in hard code. Alternatively, factory 304 executes continuously and creates new runtime instances 306 successively at an ongoing pace. The specific functional algorithm used to govern the creation of new runtime instances 306 is not critical provided that the runtime pool 210 always has at least one runtime instance 208 available for the worker thread 110 to acquire at block 204.

FIG. 3 has the benefit of not requiring validation code or monitoring code to maintain a whitelist that filters out false positive comparative results, as previously described for FIG. 2.

Embodiments may be implemented in the context of server computers that execute processes to implement applications. Tasks of a server process may include downloading HTML source code that is associated with or forms part of an application, downloading script code such as JAVASCRIPT that is referenced in the HTML source, and interpreting or running the script code. In some embodiments, the foregoing steps are invoked in response to receiving a request from a browser to access or launch an application, or to use a particular function of an application.

Figure 4:
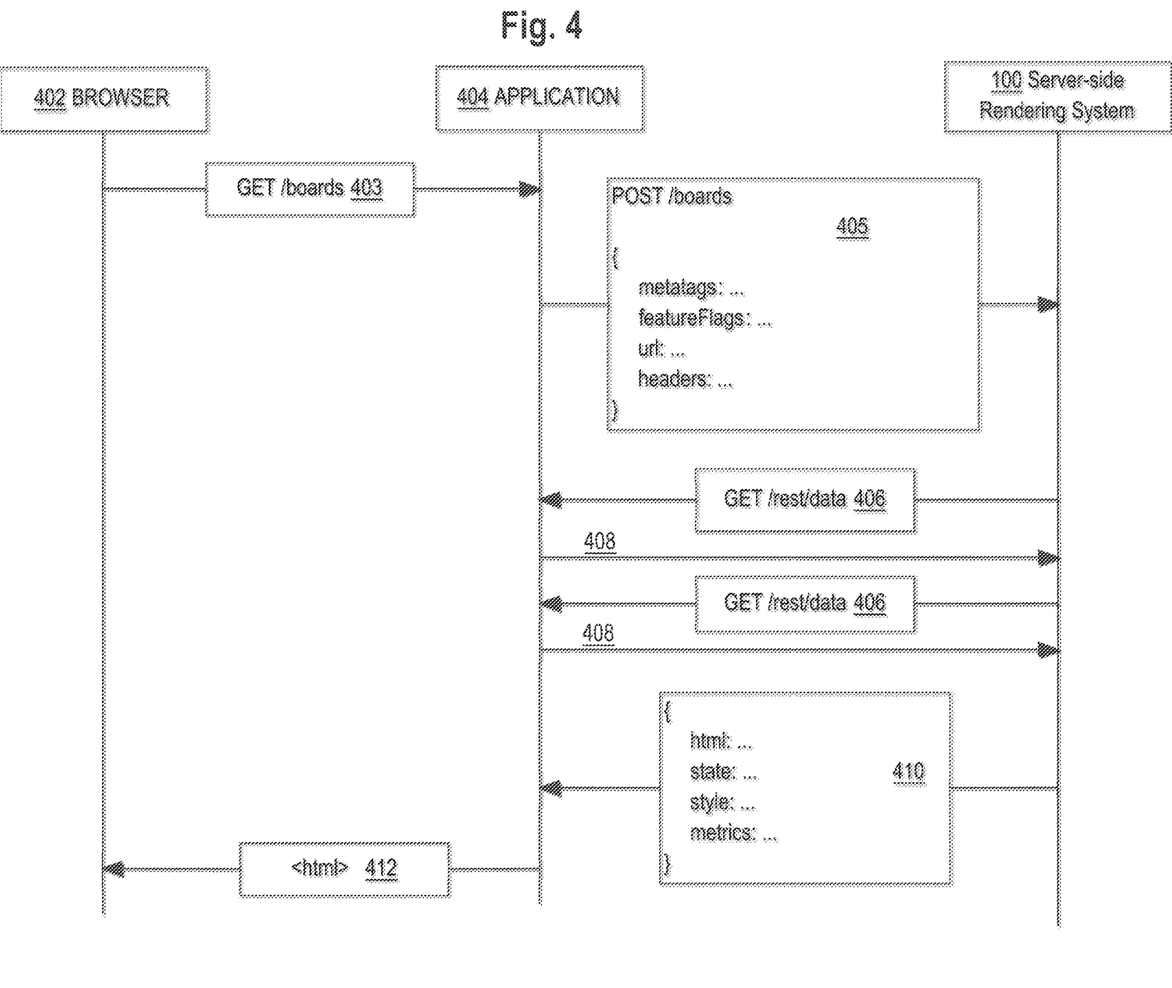
FIG. 4 illustrates an example of a client process, application process and server process in which an embodiment may be used.

FIG. 4 illustrates an example of a client process, application process and server process in which an embodiment may be used. FIG. 4 is an example of one execution context in which embodiments may be used but is not required for all embodiments. FIG. 4 is provided only to clarify, with one example, a possible environment or context in which an embodiment could be used.

The example of FIG. 4 illustrates a sequence of messages proceeding forward in time from top to bottom of the diagram. In an embodiment, a browser 402 transmits a request 403 including the HTTP directive "GET/boards" to an application 404, which is an issue tracking application; the request is to retrieve one or more message boards that organize issues from one or more projects, and which provide a flexible way of viewing, managing, and reporting on work in progress. The application 404 transforms the incoming request to an HTTP POST request 405 that is transmitted to server-side rendering system 100 (FIG. 1).

Server-side rendering system 100 then processes the request 405 by executing a runtime in the manner previously described for FIG. 2 or FIG. 3. One or more GET requests 406 (FIG. 4) may be directed to application 404 that provide data organized according to the REST protocol. These requests 406 may interleave with other requests 408 from the application, which also are subjected to server-side rendering using system 100. Each application may execute any number of REST requests, to any service or API, to retrieve all data that is needed to generate meaningful output. These requests may be directed to application 404 or any other service; the requests are part of the script code and executed as part of block 206 (FIG. 2). The sum of these requests may result in transmission of a set of code 410 comprising HTML, styling information such as CSS, and script code or other code representing a complete responsive web page or portion of a page. The code 410 may be returned to system 100 via path 214 (FIG. 2) and then to the application 404.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
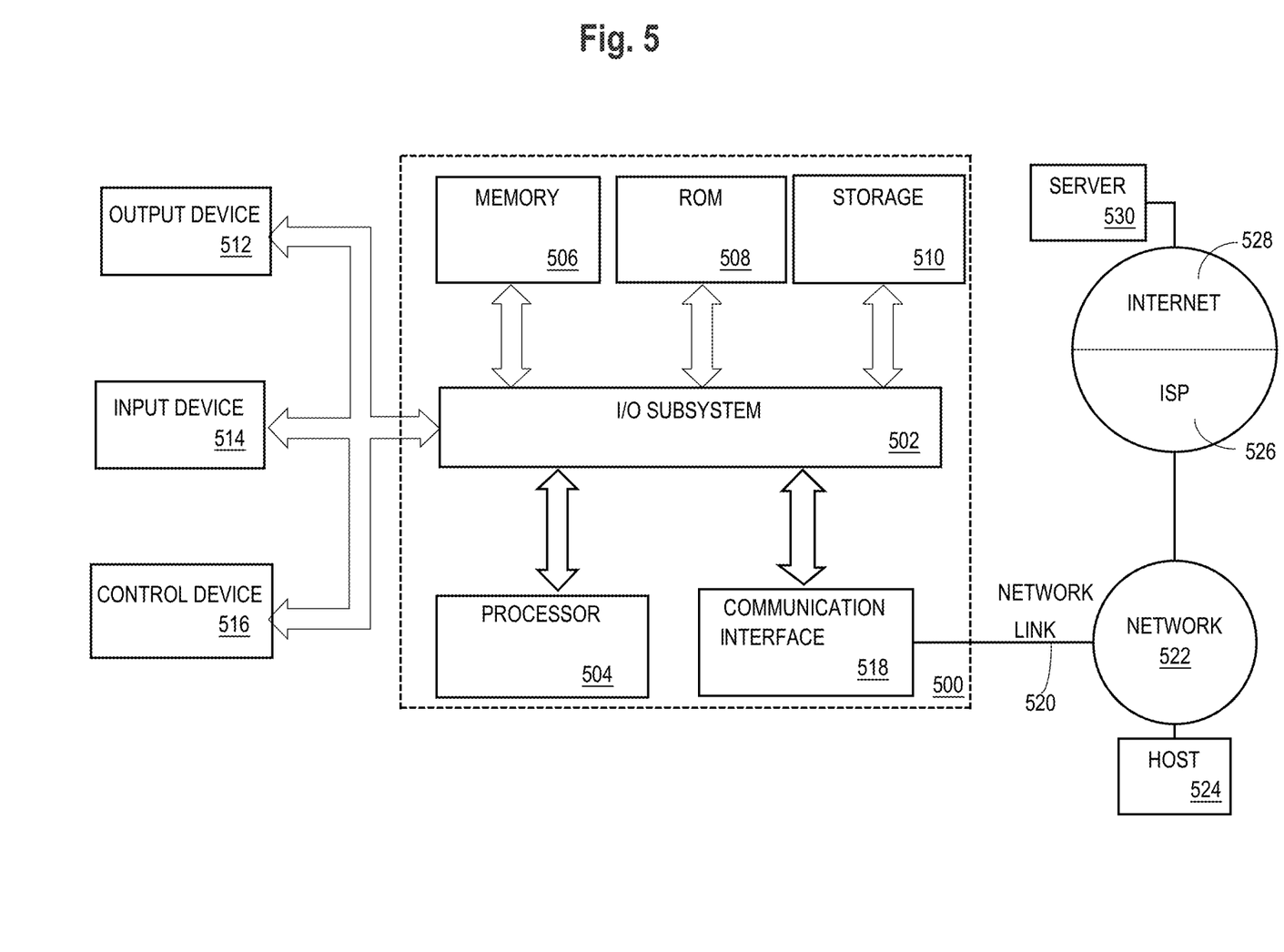
FIG. 5 is a block diagram that illustrates an example computer system with which an embodiment may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A data processing method comprising:
  receiving, at a server computer, a request from a client computer to provide a service of an application that the server computer hosts;
  acquiring a pre-computed runtime instance from a plurality of pre-computed runtime instances provided in a runtime instance pool at the server computer, each pre-computed runtime instance comprising an executable combination of computer program script code and context data, the context data comprising a set of variables, data items or memory locations having global scope that the respective computer program script code accesses during execution;

using the server computer, providing the request to the pre-computed runtime instance and executing the pre-computed runtime instance to cause generating a response to the request, wherein executing the pre-computed runtime instance includes writing data values to the set of variables, data items or memory locations having global scope included in the context data of the pre-computed runtime instance;

after generating the response, deleting the data values written to the set of variables, data items or memory locations having global scope included in the context data of the pre-computed runtime instance;

returning the executed pre-computed runtime instance to the runtime instance pool after deleting at least the data values written to the set of variables, data items or memory locations having global scope included in the context data of the pre-computed runtime instance;

instantiating a second runtime instance, providing the request to the second runtime instance, executing the second runtime instance to cause generating a second response to the request, and making a validation decision based on a comparison of the response and the second response;

wherein the second runtime instance is not acquired from the runtime instance pool.

2. The method of claim 1 in which the validation decision is based on variations identified in the comparison.

3. The method of claim 2 further comprising comparing the identified variations with a variation whitelist.

4. The method of claim 1 in which deleting at least the executed runtime instance context data comprises deleting the executed runtime instance.

5. The method of claim 4 further comprising asynchronously creating one or more new pre-computed runtimes at the server computer.

6. The method of claim 1 further comprising transmitting the response to the client computer.

7. The method of claim 1 in which the context data specifies one or more data items having global scope.

8. A data processing method comprising:

receiving, at a server computer, a request from a client computer to provide a service of an application that the server computer hosts;

acquiring a particular runtime from among a plurality of pre-computed runtimes in a runtime pool, each of the pre-computed runtimes in the runtime pool comprising an executable combination of computer program script code and context data that is programmed to create and use one or more data items having global scope;

using the server computer, providing the request to the particular runtime and executing the particular runtime to cause generating a response to the request;

transmitting the response to the client computer;

cleaning up the one or more data items having global scope and returning the particular runtime to the runtime pool after completing the cleaning up;

instantiating a second runtime instance, providing the request to the second runtime instance, executing the second runtime instance to cause generating a second response to the request, and making a validation decision based on a comparison of the response and the second response.

9. The method of claim 8, the computer program script code comprising JAVASCRIPT.

10. The method of claim 8, each of the plurality of pre-computed runtimes being identical to one another.

11. A data processing method comprising:

receiving, at a server computer, a request from a client computer to provide a service of an application that the server computer hosts;

acquiring a particular runtime instance from among a plurality of pre-computed runtime instances in a runtime pool, each of the pre-computed runtime instances in the runtime pool comprising an executable combination of computer program script code and context data that is programmed to create and use one or more data items having global scope;

using the server computer, providing the request to the particular runtime instance and executing the particular runtime instance to cause generating a response to the request;

transmitting the response to the client computer;

deleting the particular runtime instance;

asynchronously creating one or more new pre-computed runtimes instances and adding the new pre-computed runtime instances to the runtime pool;

instantiating a second runtime instance, providing the request to the second runtime instance, executing the second runtime instance to cause generating a second response to the request, and making a validation decision based on a comparison of the response and the second response.

12. The method of claim 11, the computer program script code comprising JAVASCRIPT.

13. The method of claim 11, each of the plurality of pre-computed runtimes being identical to one another.

14. A computer system comprising:

a virtual computing instance programmed to execute one or more worker processes each programmed to provide a service of an application to a client computer in response to a request from the client computer;

digital memory that is accessible to the virtual computing instance and that stores a plurality of pre-computed runtimes in a runtime pool, each of the pre-computed runtimes in the runtime pool comprising an executable combination of computer program script code and context data that is programmed to create and use one or more data items having global scope;

one or more sets of program code respectively implementing the one or more worker processes, each of the one or more sets of program code programmed to acquire a particular runtime from among the plurality of pre-computed runtimes in the runtime pool; to provide the request to the particular runtime and to execute the particular runtime to cause generating a response to the request; to transmit the response to the client computer; to clean up the one or more data items having global scope and return the particular runtime to the runtime pool after completing the cleaning up, to instantiate a second runtime instance; to provide the request to the second runtime instance; to execute the second runtime instance to cause generating a second response to the request and to make a validation decision based on a comparison of the response and the second response.

15. The computer system of claim 14, the computer program script code comprising JAVASCRIPT.

16. The computer system of claim 14, each of the plurality of pre-computed runtimes being identical to one another.

17. A computer system comprising:
a virtual computing instance programmed to execute one or more worker processes each programmed to provide a service of an application to a client computer in response to a request from the client computer;
digital memory that is accessible to the virtual computing instance and that stores a plurality of pre-computed runtimes in a runtime pool, each of the pre-computed runtimes in the runtime pool comprising an executable combination of computer program script code and context data that is programmed to create and use one or more data items having global scope;
one or more sets of program code respectively implementing the one or more worker processes, each of the one or more sets of program code programmed to acquire a particular runtime from among a plurality of pre-computed runtimes in a runtime pool, each of the pre-computed runtimes in the runtime pool comprising an executable combination of computer program script code and context data that is programmed to create and use one or more data items having global scope; to provide the request to the particular runtime and to execute the particular runtime to cause generating a response to the request; to transmit the response to the client computer; to delete the particular runtime; to asynchronously create one or more new pre-computed runtimes, to add the new pre-computed runtimes to the runtime pool, to instantiate a second runtime instance; to provide the request to the second runtime instance; to execute the second runtime instance to cause generating a second response to the request; and to make a validation decision based on a comparison of the response and the second response.

18. The computer system of claim 17, the computer program script code comprising JAVASCRIPT.

19. The computer system of claim 17, each of the plurality of pre-computed runtimes being identical to one another.

* * * * *